US012809198B2

(12) United States Patent
Park et al.

(10) Patent No.: US 12,809,198 B2
(45) Date of Patent: Nov. 24, 2026

(54) FILMLESS OUTER LENS WITH AUTO SHADING

(71) Applicant: GM GLOBAL TECHNOLOGY OPERATIONS LLC, Detroit, MI (US)

(72) Inventors: Jonglee Park, Novi, MI (US); Julien P. Mourou, Bloomfield Hills, MI (US); Bradley Allen Newcomb, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 273 days.

(21) Appl. No.: 18/442,598

(22) Filed: Feb. 15, 2024

(65) Prior Publication Data

US 2025/0264743 A1 Aug. 21, 2025

(51) Int. Cl.
*G02F 1/03* (2006.01)
*G02F 1/163* (2006.01)

(52) U.S. Cl.
CPC .......... *G02F 1/0311* (2013.01); *G02F 1/0327* (2013.01); *G02F 1/163* (2013.01)

(58) Field of Classification Search
CPC ......... G02C 7/101; G02C 7/16; G02F 1/0311; G02F 1/0327; G02F 1/163; B60J 3/04; Y02T 10/7072; Y02T 90/12; Y02T 90/14; H04N 13/305; H04N 13/359
See application file for complete search history.

(56) References Cited

U.S. PATENT DOCUMENTS

| | | | | |
|---|---|---|---|---|
| 9,597,998 B2 | 3/2017 | Ovenshire et al. | | |
| 2006/0250809 A1* | 11/2006 | Strazzanti | F21S 41/645 | 362/538 |
| 2014/0328078 A1* | 11/2014 | Williams | F21S 41/50 | 362/512 |

FOREIGN PATENT DOCUMENTS

| | | | | |
|---|---|---|---|---|
| CN | 104142586 A | 11/2014 | | |
| CN | 120488163 A * | 8/2025 | B60J 3/04 | |
| DE | 102013108811 A1 | 2/2015 | | |
| DE | 102016210257 A1 | 12/2016 | | |
| DE | 202018106776 U1 | 12/2018 | | |

OTHER PUBLICATIONS

DE Office Action for Appln No. 10 2024 109 376.5 dated Oct. 17, 2024, 4 pages.

* cited by examiner

*Primary Examiner* — Brandi N Thomas

(74) *Attorney, Agent, or Firm* — CANTOR COLBURN LLP

(57) ABSTRACT

Aspects of the disclosure include filmless outer lenses with auto-shading and methods of manufacturing and using the same. An exemplary vehicle includes an outer lens having a bottom lens and a top lens fixed to the bottom lens. An auto-shading material is embedded between the bottom lens and the top lens. The auto-shading material includes discrete substructures which vary in alignment in response to an electric field, thereby varying at least one of a transmittance and an emitted color through the outer lens. A wire is electrically coupled to the auto-shading material. A controller electrically coupled to the wire is configured to direct a switching voltage to a switch to change a state of the switch, thereby causing the wire to deliver the electric field to the discrete substructures to change at least one of the transmittance and the emitted color through the outer lens.

20 Claims, 6 Drawing Sheets

FILMLESS OUTER LENS WITH AUTO SHADING

INTRODUCTION

The subject disclosure relates to lighting technologies, and particularly to leveraging a filmless outer lens with auto-shading for transparent and nontransparent applications.

Auto-shading films or laminates, also known as variable transmittance, auto-dimming, or self-dimming glass panels, are advanced laminates that can dynamically adjust their level of transparency in response to a range of external factors, such as light intensity, temperature, and/or user preferences. By modulating the degree of transparency, variable transmittance glass panels can adjust the level of shading (e.g., auto-dimming) provided by the panel as desired. Variable transmittance glass panels have been applied to a range of applications across various industries, including automotive, architectural, and aerospace industries. These types of panels are particularly useful in applications such as windows, sunroofs, skylights, and architectural facades, where the amount of light and heat entering a space needs to be regulated for comfort, energy efficiency, and privacy.

SUMMARY

In one exemplary embodiment a vehicle includes an outer lens having a bottom lens coated with a first coating conductive layer and a top lens coated with a second coating conductive layer. The top lens is fixed to the bottom lens. An auto-shading material is embedded between the bottom lens and the top lens. The auto-shading material includes discrete substructures which vary in alignment in response to an electric field, thereby varying at least one of a transmittance and an emitted color through the outer lens. A wire is electrically coupled to the auto-shading material. A controller electrically coupled to the wire is configured to direct a switching voltage to a switch to change a state of the switch, thereby causing the wire to deliver the electric field to the discrete substructures to change at least one of the transmittance and the emitted color through the outer lens.

In addition to one or more of the features described herein, in some embodiments, the auto-shading material includes a filmless auto-shading material.

In some embodiments, the top lens is fixed to the bottom lens via one or more sealing caps.

In some embodiments, the top lens and the bottom lens include transparent materials. In some embodiments, the top lens includes transparent materials and the bottom lens includes opaque materials.

In some embodiments, the auto-shading material includes a first transmittance when the switch is in a first state and a second transmittance greater than the first transmittance when the switch is in a second state.

In some embodiments, the outer lens emits a first color when the switch is in a first state and a second color different than the first color when the switch is in a second state.

In another exemplary embodiment a lens includes a bottom lens coated with a first coating conductive layer and a top lens coated with a second coating conductive layer. The top lens is fixed to the bottom lens. The lens includes an auto-shading material embedded between the bottom lens and the top lens. The auto-shading material includes discrete substructures which vary in alignment in response to an electric field, thereby varying at least one of a transmittance and an emitted color through the lens. A wire is electrically coupled to the auto-shading material.

In some embodiments, the auto-shading material includes a filmless auto-shading material.

In some embodiments, the top lens and the bottom lens include transparent materials. In some embodiments, the top lens includes a transparent material and the bottom lens includes an opaque material.

In some embodiments, the wire is electrically coupled to a controller, and the controller is configured to direct a switching voltage to a switch to change a state of the switch, thereby causing the wire to deliver the electric field to the discrete substructures to change at least one of the transmittance and the emitted color through the lens.

In some embodiments, the auto-shading material includes a first transmittance when the switch is in a first state and a second transmittance greater than the first transmittance when the switch is in a second state.

In some embodiments, the lens emits a first color when the switch is in a first state and a second color different than the first color when the switch is in a second state.

In yet another exemplary embodiment a method can include providing an outer lens by coating a bottom lens with a first coating conductive layer, coating a top lens with a second coating conductive layer, and fixing the top lens to the bottom lens. The method can include embedding an auto-shading material between the bottom lens and the top lens. The auto-shading material includes discrete substructures which vary in alignment in response to an electric field, thereby varying at least one of a transmittance and an emitted color through the outer lens. The method can include electrically coupling a wire to the auto-shading material and electrically coupling a controller to the wire. The controller can be configured to direct a switching voltage to a switch to change a state of the switch from a first state to a second state, thereby causing the wire to deliver the electric field to the discrete substructures to change at least one of the transmittance and the emitted color through the outer lens. The method can include receiving a call for the second state and, responsive to the call, directing the switching voltage to the switch, thereby causing the switch to change from the first state to the second state.

In some embodiments, the auto-shading material includes a filmless auto-shading material.

In some embodiments, the top lens and the bottom lens include transparent materials. In some embodiments, the top lens includes transparent materials and the bottom lens includes opaque materials.

In some embodiments, the auto-shading material includes a first transmittance when the switch is in the first state and a second transmittance greater than the first transmittance when the switch is in the second state.

In some embodiments, the outer lens emits a first color when the switch is in the first state and a second color different than the first color when the switch is in the second state.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
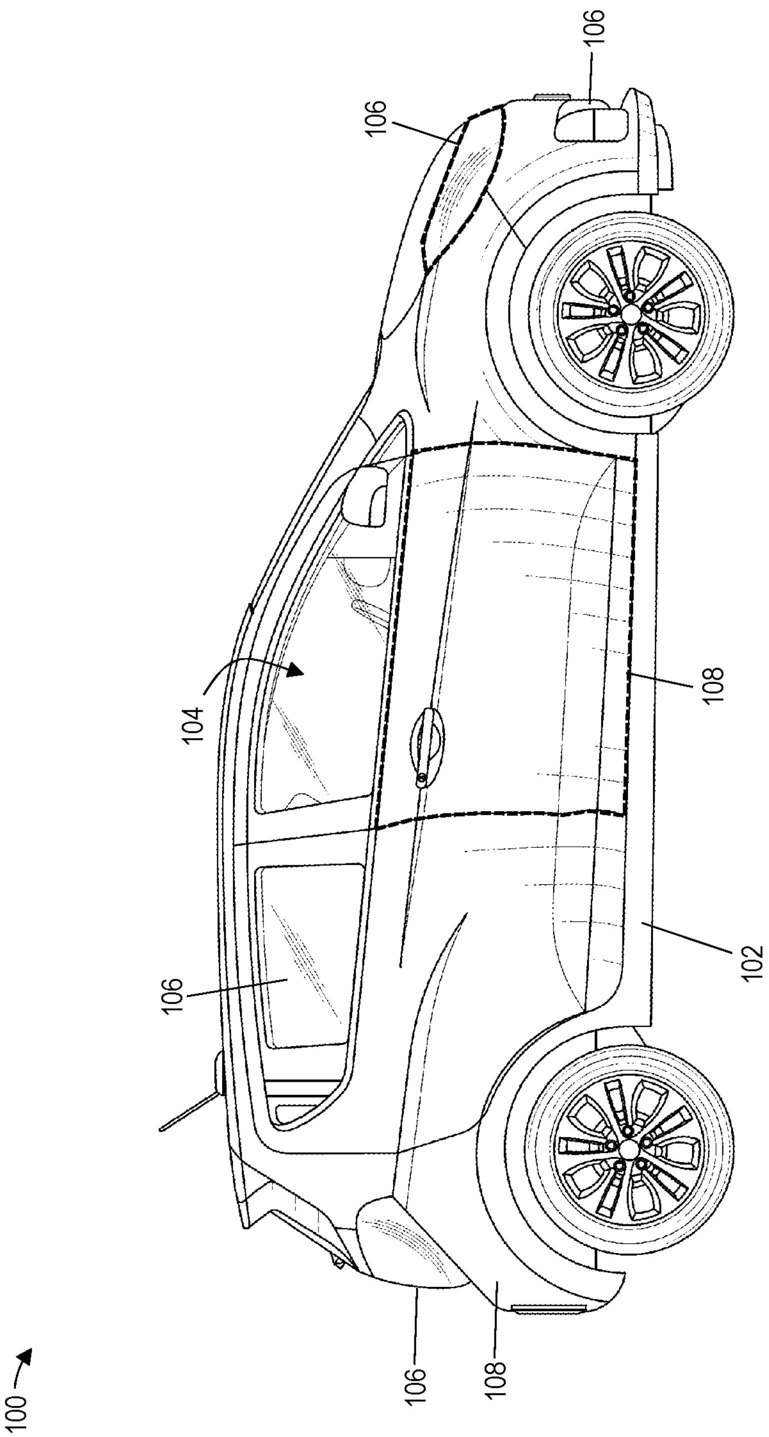
FIG. 1 is a vehicle configured in accordance with one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Auto-shading films are typically made of polymer dispersed liquid crystal (PDLC) and/or electrochromic (EC) materials that can alter their optical properties in response to a stimuli, for example, an applied voltage. Notably, such films can seamlessly transition between different levels of transparency, opaqueness, and even color and can be leveraged to dynamically respond to external factors such as light intensity, temperature fluctuations, and even user preferences. In the automotive industry, for instance, auto-shading films can be integrated into windows, sunroofs, and other transparent surfaces to enhance the driving experience. For example, a window made using auto-shading films can vary in transparency for passengers' privacy and comfort. These variations can be controlled by the driver and/or passengers themselves and/or automatically (e.g., dynamically increase opacity in response to a measured increase in sunlight intensity). In architectural applications, these auto-shading films find use in windows, skylights, and facades, enabling architects and designers to create environments that balance natural light with privacy and energy efficiency.

Auto-shading films are typically integrated within a lighting and/or lens system using a so-called over-molding process. In these fabrication schemes, an auto-shading film is laminated between inner and outer layers of a laminate composite (e.g., inner and outer lenses). The process can begin with the preparation of a lens substrate, often made of glass or other transparent materials. The auto-shading film is carefully applied to the surface of the lens substrate. A thermal conductive layer might be added to enhance the auto-shading film's ability to withstand high temperatures during the subsequent over-molding. Over-molding itself involves the incorporation of an over-molding material, such as a thermoplastic and/or thermosetting polymer, which can be applied to the auto-shading film-coated lens substrate using heat and/or pressure to encapsulate the auto-shading film within the resulting laminate. The material used for over-molding is chosen based on factors such as compatibility with the auto-shading film, desired mechanical properties of the final laminate, and the selected manufacturing method.

However, challenges arise in completing the over-molding process when aggressive curvatures are involved or desired. In particular, auto-shading films are not natively compatible with all possible lens geometries-sufficiently small radii curvatures cause auto-shading films to delaminate during the molding process due to the intense shaping demands. As used herein, a "small radii curvature" means a curvature of a radii of less than 300 mm, as auto-shading films delaminate and/or are otherwise structurally unstable beyond this curvature. This limitation inherently constrains the types of lens designs available for auto-shading applications.

This disclosure introduces a filmless outer lens with auto-shading for transparent and nontransparent applications. Rather than rely on auto-shading films that are natively incompatible with small radii curvatures, the present disclosure introduces a way to fabricate an auto shading system without the use of auto shading films. The result is a new filmless outer lens architecture that is compatible with transparent and nontransparent applications having arbitrary radii curvatures.

In some embodiments, an outer lens is built from a top lens and a bottom lens produced by separate injection molding processes. A transparent conductive material can be applied to the inside surface of one or both of the top lens and the bottom lens to provide electrical energy to an auto shading material that fills the gap between the top lens and the bottom lens. In some embodiments, the top lens and the bottom lens can be assembled together and the auto shading material can be added through a prefabricated opening in the assembly. The opening can be closed using a sealing material to secure the auto shading material therein. A moisture barrier coating layer can be added to one or both of the top lens and the bottom lens to prevent any condensation inside the outer lens depending on the auto shading materials of a given application (e.g., for humidity sensitive materials such as EC).

Filmless outer lenses constructed in accordance with one or more embodiments offer several technical advantages over prior film-based architectures. Notably, filmless outer lenses described herein can be applied to transparent and nontransparent applications having arbitrary radii curvatures as described previously. Other advantages are possible. For transparent applications, filmless outer lenses described herein can be leveraged to enhance vehicle styling on exterior and/or interior lighting assemblies (particularly for tightly curved surfaces previously incompatible with auto-shading applications). For nontransparent applications, an opaque conductive material or lens material can be applied to the bottom lens, enabling, in combination with color-changing auto shading materials, color-changing parts. Moreover, filmless outer lenses described herein can include structural composites incorporated during the molding process for straightforward compatibility with large, nontransparent substrates such as, for example, roof glazing structures.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). Body 102 also includes a number of transparent structures 106 and nontransparent structures 108. While not meant to be particularly limited, the transparent structures 106 can include, for example, interior and/or exterior glass or polymer laminate lighting assemblies such as head lamps, front headlights, rear taillights, turn signals, reverse lights, decorative and signature lighting, etc. While not meant to be particularly limited, the nontransparent structures 108 can include, for example, door panels, a roof, a hood, running boards, etc. The particular transparent structures 106 and/or nontransparent structures 108 emphasized in FIG. 1 (i.e., the passenger door, the front headlight, etc.) are emphasized only for example, ease of illustration, and discussion. It should be understood that any aspect of the present disclosure can be applied to any transparent and/or nontransparent structure, including those of the vehicle 100 as well as in non-automotive applications.

As will be detailed herein, one or more of the transparent structures 106 and/or one or more of the nontransparent structures 108 incorporate a filmless outer lens with auto-shading capabilities (also referred to as a filmless auto-shading lens). An illustrative filmless auto-shading lens is discussed in greater detail with respect to FIGS. 2A and 2B. An illustrative process for fabricating a filmless auto-shading lens is discussed in greater detail with respect to FIG. 3.

Figure 2B:
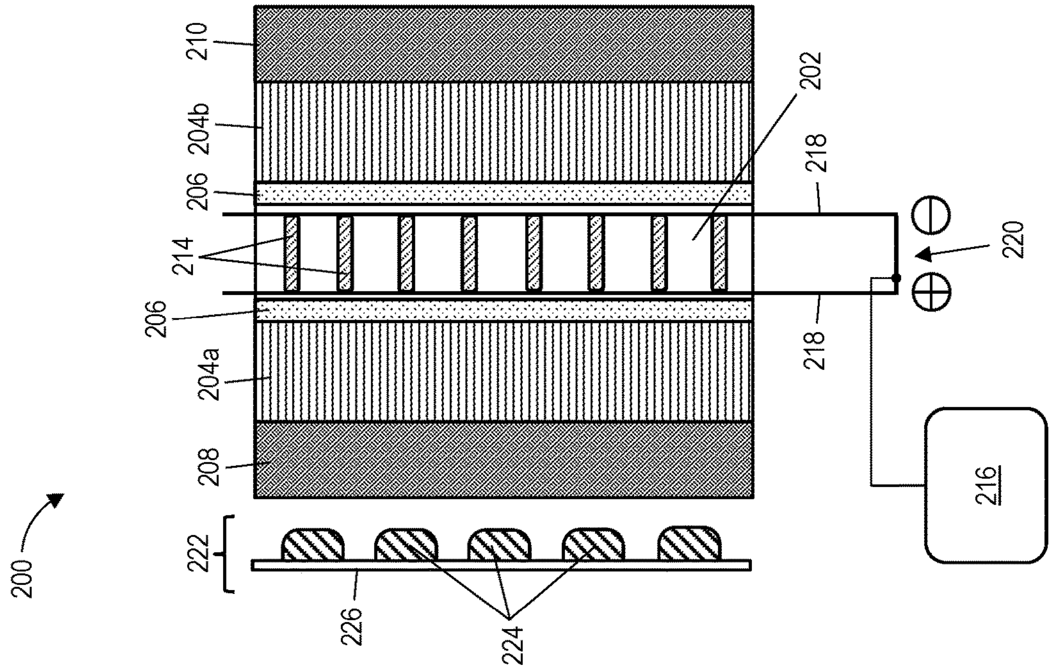
FIG. 2B is a cross-sectional view of the filmless auto-shading outer lens of FIG. 2A in a second state in accordance with one or more embodiments.
Figure 2A:
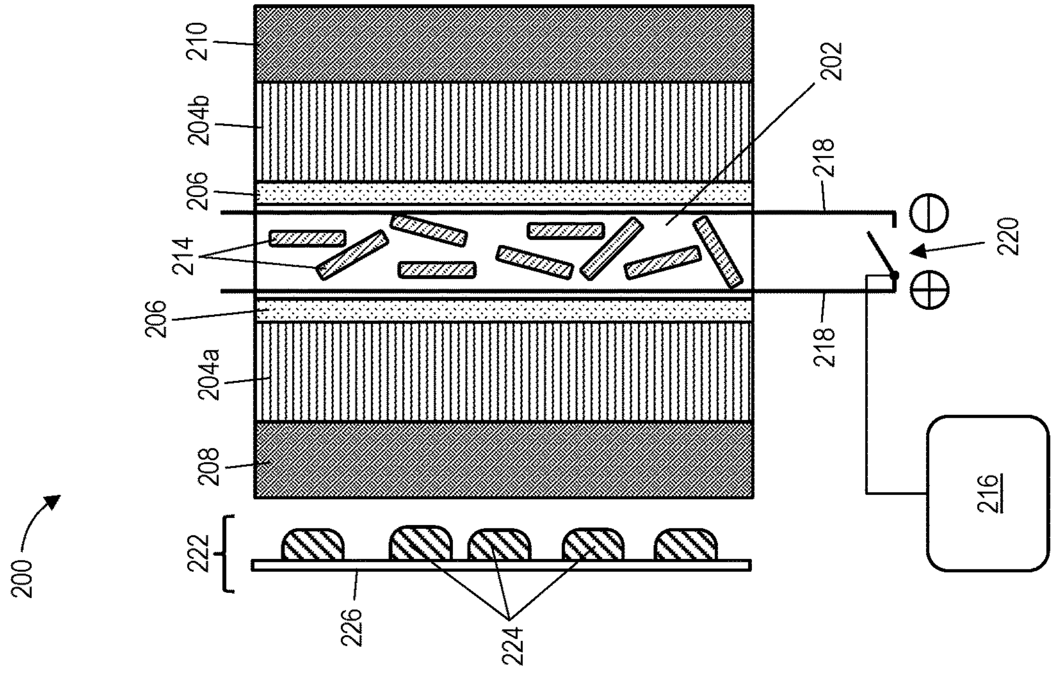
FIG. 2A is a cross-sectional view of a filmless auto-shading outer lens in a first state in accordance with one or more embodiments.

FIGS. 2A and 2B illustrate cross-sectional views of a filmless auto-shading outer lens 200 (referred to simply as the outer lens 200) in accordance with one or more embodiments. The outer lens 200 can be incorporated within the transparent and/or nontransparent structures of any system (e.g., the transparent structures 106 and/or nontransparent structures 108 of the vehicle 100 of FIG. 1). FIG. 2A illustrates the outer lens 200 in a first state and FIG. 2B illustrates the outer lens 200 in a second state. In some embodiments, the first state is an opaque or frosted state (e.g., a relatively low transmittance state) and the second state is a clear state (e.g., a relatively high transmittance state).

As shown in FIGS. 2A and 2B, the outer lens 200 includes an auto-shading material 202 fixed between optional thermally conductive multi-layers 204*a* and 204*b*. The auto-shading material 202 can be made of any suitable material known for providing a variable, controllable transmittance, such as, for example, a polymer such as PDLC, an EC material, and/or a tungsten oxide ($WO_3$) based material. Other auto-shading materials are possible and all such configurations are within the contemplated scope of this disclosure.

The thermally conductive multi-layers 204*a* and 204*b*, if present, can be made of the same, or different, layers. In some embodiments, the thermally conductive multi-layers 204*a* and 204*b* each include a thermal conductive coating layer. The thickness of the thermally conductive multi-layers 204*a* and 204*b* can vary as desired based on thermal threading performance. In some embodiments, the thickness of the thermally conductive multi-layers 204*a* and 204*b* is between 0.5 and 5.0 mm, although other thicknesses are within the contemplated scope of this disclosure. In some embodiments, the thermally conductive multi-layers 204*a* and 204*b* can be made of optically transparent or near transparent materials (transparency greater than 90 percent). In some embodiments, the thermally conductive multi-layers 204*a* and 204*b* are not transparent. For example, in some embodiments, the thermal conductive layer is made of a nontransparent material, such as, for example, carbon black and/or metal foil(s), and/or from relatively thicker layers which impede transparency. In some embodiments, the thermal conductive layer includes a graphene layer (k~3000 W/m-K), a single layer hexagonal boron nitride (h-BN) (k~550 W/m-K), aluminum oxide ($Al_2O_3$) (k~10 W/m-K), sapphire (k~1000 W/m-K), and/or indium tin oxide (k~2 W/m-K), although other materials are within the contemplated scope of this disclosure.

Advantageously, in some embodiments, the thermally conductive multi-layers 204*a* and 204*b* are not present (that is, they can be omitted) and the auto-shading material 202 is fixed between a bottom lens 208 and a top lens 210 of the outer lens 200. The thermally conductive multi-layers 204*a* and 204*b* can be omitted in one or more embodiments because the auto-shading material 202 does not experience a conventional co-molding process. The ability to skip the thermally conductive multi-layers 204*a* and 204*b* represents an observable advantage over lenses made using a co-molding process with an auto shading film.

In some embodiments, a moisture barrier coating layer 206 is positioned between the auto-shading material 202 and the thermally conductive multi-layers 204*a* and 204*b*. The moisture barrier coating layer 206 can prevent condensation inside the outer lens 200 before, during, and after a molding process used to form/laminate the outer lens 200 (refer to FIG. 3).

As further shown in FIGS. 2A and 2B, the outer lens 200 is a composite lens that includes the bottom lens 208 and the top lens 210. The bottom lens 208 and the top lens 210 are coupled (e.g., sealed) together to encapsulate the auto-shading material 202 and, when present, the thermally conductive multi-layers 204*a* and 204*b*.

The bottom lens 208 and the top lens 210 can be made of a range of suitable transparent and nontransparent polymers for overmolding. For transparent applications, for example, the bottom lens 208 and the top lens 210 can both be made of transparent materials. For nontransparent applications, for example, the bottom lens 208 can be made of opaque materials and the top lens 210 can be made of transparent materials. In some embodiments, the bottom lens 208 and the top lens 210 are made of benzoxazine, a bis-maleimide (BMI), a cyanate ester, an epoxy, a phenolic (PF), a polyacrylate (acrylic), a polyimide (PI), an unsaturated polyester, a polyurethane (PUR), a vinyl ester, a siloxane, co-transparent layers thereof, and combinations thereof. In certain aspects, the bottom lens 208 and the top lens 210 may be a thermoplastic transparent layer selected from the group consisting of: polyethylenimine (PEI), polyamide-imide (PAI), polyamide (PA) (e.g., nylon 6, nylon 66, nylon 12, nylon 11, nylon 6-3-T), polyetheretherketone (PEEK), polyetherketone (PEK), Polyvinyl Chloride (PVC), a polyphenylene sulfide (PPS), a thermoplastic polyurethane (TPU), polypropylene (PP), polycarbonate/acrylonitrile butadiene styrene (PC/ABS), high-density polyethylene (HDPE), polyethylene terephthalate (PET), poly(methyl methacrylate) (PMMA), Styrene Methyl Methacrylate (SMMA), Methyl Methacrylate Acrylonitrile Butadiene Styrene (MABS), polycarbonate (PC), polyaryletherketone (PAEK), polyetherketoneketone (PEKK), co-transparent layers thereof, and combinations thereof.

In some embodiments, the auto-shading material 202 of the outer lens 200 includes discrete molecules and/or substructures 214 which vary in alignment and/or in optical properties (e.g., color, transmittance, etc.) in response to an applied electric current. The substructures 214 and/or the auto-shading material 202 can be made of electrochromic and/or liquid crystal materials.

In some embodiments, the substructures 214 include electrochromic pigments and/or materials that change in color and/or opacity in response to an applied voltage. In some embodiments, the substructures 214 include electrochromic pigments that undergo reversible electrochemical reactions when an electric current is passed through them. For example, depending on the voltage applied, the substructures 214 (e.g., molecules) can either absorb or reflect light, altering the transparency of the auto-shading material 202. In another example, depending on the voltage applied, the substructures 214 (e.g., molecules) can cause light passing through the auto-shading material to switch between a first color and/or transparency (red, white, clear, etc.) and a second color and/or transparency (green, black, opaque, etc.) as desired.

In some embodiments, the substructures 214 include liquid crystal molecules that can change their alignment and/or optical properties when subjected to an electric field. By applying a voltage, the orientation of the liquid crystal molecules can be controlled, allowing the auto-shading material 202 to transition between states (for example, between transparent and opaque states, or between a first color and a second color, etc.) by changing the applied voltage (or current).

In some embodiments, the transmittance (or opacity or color, etc.) of the auto-shading material 202 is controlled using an external control mechanism which includes a controller 216, wires 218, and a switch 220. In some embodiments, the controller 216 is configured to direct (or withhold) a switching current to (from) the switch 220. While not meant to be particularly limited, in some embodiments, the controller 216 can include, for example, an Electronic Control Unit (ECU) of a vehicle (e.g., the vehicle 100).

In some embodiments, the wires 218 are embedded within the auto-shading material 202 so that closing the switch 220 results in the application of a driving current to the substructures 214. The driving current can be provided via the controller 216 and/or via an external power source (not separately shown). In some embodiments, opening the switch 220 results in the substructures 214 being positioned in a random state (refer to FIG. 2A), while closing the switch 220 results in the substructure 214 being aligned to the resultant electric field (refer to FIG. 2B). In some embodiments, the outer lens 200 emits a first color when switch 220 is in a first state (e.g., green) and a second color different from the first color (e.g., red) when switch 220 is in a second state.

In some embodiments, positioning the substructures 214 randomly results in a low transmittance state, as light from a light source will be wholly or partially deflected, absorbed, and reflected from the substructures 214. In some embodiments, aligning the substructures 214 with an applied electric field results in a high transmittance state, as light from a light source will be free to pass between the substructures 214 and across the auto-shading material 202. Alternatively, or in addition, positioning the substructures 214 randomly can result in light being emitted at a first frequency (that is, a first color) while aligning the substructures 214 with an applied electric field results in light being emitted at a second frequency (that is, a second color).

FIG. 2A depicts the auto-shading material 202 and switch 220 in an open, first state, while FIG. 2B depicts the auto-shading material 202 and switch 220 in a closed, second state.

In some embodiments, the outer lens 200 is positioned to receive light from a light source 222. The light source 222 can be made of any suitable materials, such as, for example, incandescent bulbs, fluorescent tubes, LEDs (light-emitting diodes), halogen lamps, etc. In some embodiments, the light source 222 includes an array of LEDs 224 arranged on a substrate 226. The substrate 226 can include, for example, a backplane, although other configurations are within the contemplated scope of this disclosure.

While not meant to be particularly limited, configuring the outer lens 200 in this manner allows for the outer lens 200 to be leveraged within a variety of lighting applications. For example, during a "day" mode, a lighting assembly including the outer lens 200 can be set to maximum opacity (i.e., minimum transmittance) by opening the switch 220. In this state the lighting assembly visually blends into the surrounding materials to create a seamless look. On the other hand, during a "night" mode or during any period where the low beams and/or high beams are called, the switch 220 can be closed to transition the auto-shading material 202 to a maximum transmittance state to allow as much light as possible to exit the outer lens 200, enabling efficient emission of bright light to surrounding drivers and pedestrians.

Figure 3:
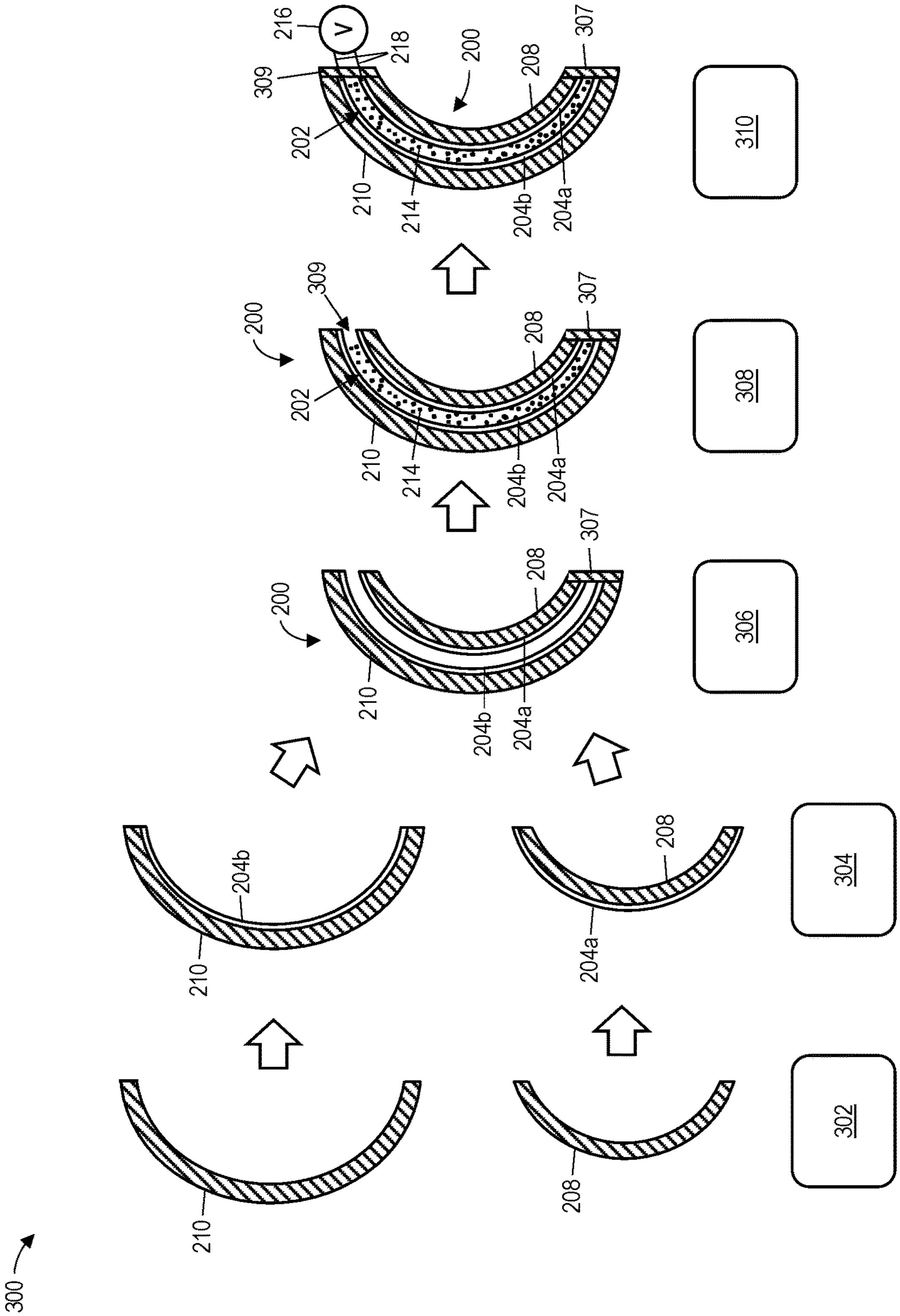
FIG. 3 is an example process flow for fabricating a filmless auto-shading lens in accordance with one or more embodiments.

FIG. 3 illustrates an example process flow 300 for fabricating a filmless auto-shading lens (e.g., the outer lens 200 of FIGS. 2A and 2B) in accordance with one or more embodiments. As shown in FIG. 3, the process flow 300 begins at step 302. At step 302, the bottom lens 208 and the top lens 210 are separately fabricated using, for example, injection molding, although other molding techniques are within the contemplated scope of this disclosure.

At step 304, one of both of the bottom lens 208 and the top lens 210 (as shown, both) are optionally separately coated with the thermally conductive multi-layers 204*a* and 204*b*, respectively. The thermally conductive multi-layers 204*a* and 204*b* can include, for example, a coating conductive layer as discussed previously. In some embodiments, the thermally conductive multi-layers 204*a* and 204*b* are omitted (not separately shown).

At step 306, the bottom lens 208 and the top lens 210 are assembled to define an outer lens 200. In some embodiments, the bottom lens 208 is fixed to the top lens 210 using thermal and/or pressure-based laminate molding techniques. In some embodiments, the bottom lens 208 and the top lens 210 are joined via a sealing cap 307. In some embodiments, the bottom lens 208 and the top lens 210 can be joined using a combination of thermal and/or pressure-based molding/laminate techniques and the sealing cap 307. In some embodiments, the sealing cap 307 includes an adhesive. In some embodiments, the sealing cap 307 is made of a material that can melt, weld, and/or otherwise bind the bottom lens 208 to the top lens 210 such as, for example, glass, PC, PMMA, etc. and combinations thereof.

At step 308, the auto-shading material 202 having the substructures 214 is injected between the bottom lens 208 and the top lens 210. In some embodiments, the auto-shading material 202 is injected through an opening 309 left in the outer lens 200. Notably, the auto-shading material 202 can be formed in this manner without relying on an auto-shading film. Advantageously, leveraging an injection-based process as described herein enables a range of previously unavailable, non-glass-laminate applications, such as the use of auto-shading materials for molded parts (e.g., doors, hoods, opaque work pieces, etc.).

In some embodiments, the opening 309 is defined prior to injecting the auto-shading material 202. In other words, the dimensions of the opening 309 can be maintained to ensure a uniform filling between the bottom lens 208 and the top lens 210. In some embodiments, the dimensions of the opening 309 are secured using the sealing cap 307.

Figure 4B:
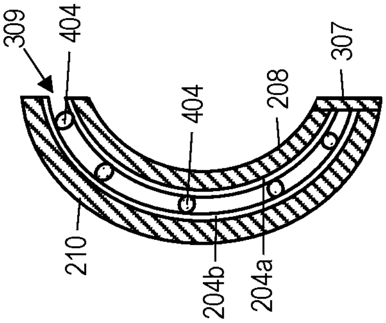
FIG. 4B is a view of spacers for securing an opening for injecting auto-shading material between a bottom lens and a top lens in accordance with one or more embodiments.
Figure 4C:
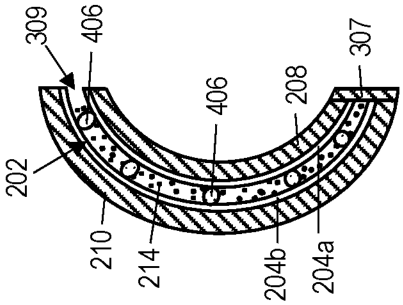
FIG. 4C is a view of an opening secured via beads injected with an auto-shading material between a bottom lens and a top lens in accordance with one or more embodiments.
Figure 4A:
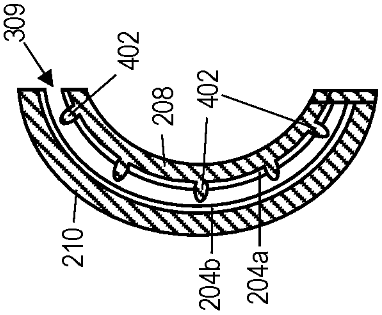
FIG. 4A is a view of a molded part for securing an opening for injecting auto-shading material between a bottom lens and a top lens in accordance with one or more embodiments.

In some embodiments, the dimensions of the opening 309 are defined using a molded part 402 fixed to (or protruding from, in monolithic embodiments) one or both of the bottom lens 208 and the top lens 210. FIG. 4A shows a view of an opening 309 defined via a molded part 402 in accordance with one or more embodiments. The molded part 402 can be monolithically fixed (that is, is made of a same piece) as the bottom lens 208 (as shown) and/or the top lens 210 (not separately shown).

In some embodiments, the dimensions of the opening 309 are defined using one or more spacers 404 that are formed by coating the respective surfaces of the bottom lens 208 and/or the top lens 210 with a spacer material, such as a dielectric. FIG. 4B shows a view of an opening 309 defined via spacers 404 in accordance with one or more embodiments. In some embodiments, the spacers 404 can be made of a same material as the bottom lens 208 and the top lens 210 and/or as the optional thermally conductive multi-layers 204*a* and 204*b*.

In some embodiments, the dimensions of the opening 309 are defined using one or more beads 406 that are inserted (e.g., injected) into the opening 309 alongside the auto-shading material 202 and the substructures 214. FIG. 4C shows a view of an opening 309 defined via beads 406 in accordance with one or more embodiments.

At step 310, sealing of the outer lens 200 is completed using, for example, a sealing cap 309. The sealing cap 309 can be used to seal the outer lens 200 in a similar manner as described previously with respect to the sealing cap 307. In some embodiments, the sealing cap 309 includes one or more embedded wires (e.g., the wires 218 of FIGS. 2A and 2B). In some embodiments, the wires 218 are electrically coupled to a voltage source (e.g., the controller 216 and/or switch 220 of FIGS. 2A and 2B).

Figure 5:
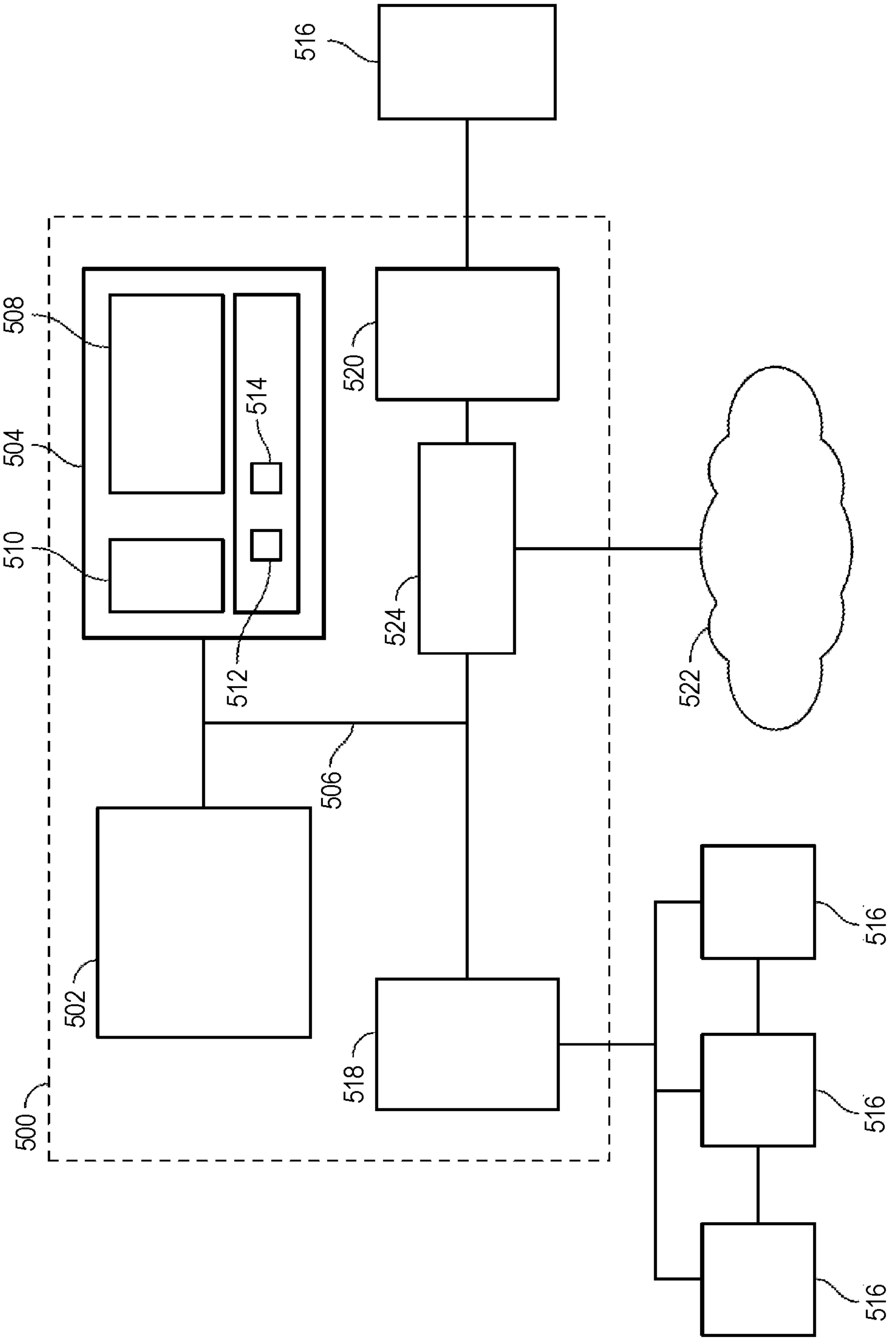
FIG. 5. is a computer system according to one or more embodiments.

FIG. 5 illustrates aspects of an embodiment of a computer system 500 that can perform various aspects of embodiments described herein. In some embodiments, the computer system 500 can be incorporated within or in combination with a controller (e.g., controller 216). The computer system 500 includes at least one processing device 502, which generally includes one or more processors for performing a variety of functions, such as, for example, controlling switching and/or driving voltages to the switch 220 and/or the wires 218. More specifically, the computer system 500 can include the logic necessary to adjust the transmittance of an auto-shading material (e.g., the auto-shading material 202) via application of an electric current as described previously herein.

Components of the computer system 500 include the processing device 502 (such as one or more processors or processing units), a system memory 504, and a bus 506 that couples various system components including the system memory 504 to the processing device 502. The system memory 504 may include a variety of computer system readable media. Such media can be any available media that is accessible by the processing device 502, and includes both volatile and non-volatile media, and removable and non-removable media.

For example, the system memory 504 includes a non-volatile memory 508 such as a hard drive, and may also include a volatile memory 510, such as random access memory (RAM) and/or cache memory. The computer system 500 can further include other removable/non-removable, volatile/non-volatile computer system storage media.

The system memory 504 can include at least one program product having a set (e.g., at least one) of program modules that are configured to carry out functions of the embodiments described herein. For example, the system memory 504 stores various program modules that generally carry out the functions and/or methodologies of embodiments described herein. A module or modules 512, 514 may be included to perform functions related to control of the switch 220, the value of an applied voltage and/or current, etc. The computer system 500 is not so limited, as other modules may be included depending on the desired functionality of the respective displays. As used herein, the term “module” refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 502 can also be configured to communicate with one or more external devices 516 such as, for example, a keyboard, a pointing device, and/or any devices (e.g., a network card, a modem, vehicle ECUs, etc.) that enable the processing device 502 to communicate with one or more other computing devices. Communication with various devices can occur via Input/Output (I/O) interfaces 518 and 520.

The processing device 502 may also communicate with one or more networks 522 such as a local area network (LAN), a general wide area network (WAN), a bus network and/or a public network (e.g., the Internet) via a network adapter 524. In some embodiments, the network adapter 524 is or includes an optical network adaptor for communication over an optical network. It should be understood that although not shown, other hardware and/or software components may be used in conjunction with the computer system 500. Examples include, but are not limited to, microcode, device drivers, redundant processing units, external disk drive arrays, RAID systems, and data archival storage systems, etc. In some embodiments, the computer system 500 and/or the processing device 502 can receive information from one or more micro sensors (e.g., the sensor units 302), analyze said information, and send the information (raw, pre-processed, and/or post-processed) to one or more LEDs (e.g., the micro LEDs 210) and/or any other component of the vehicle 100.

Figure 6:
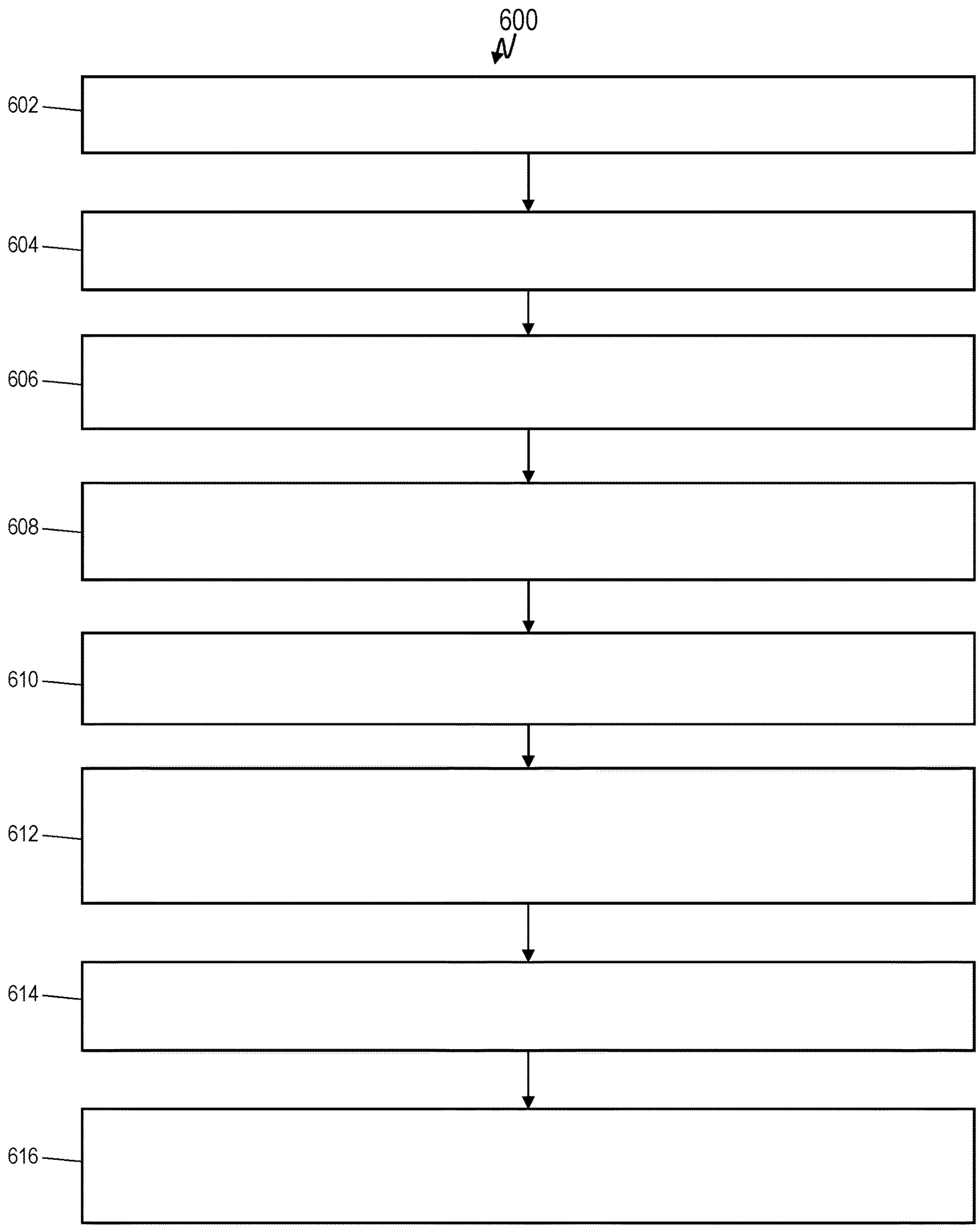
FIG. 6 is a flowchart in accordance with one or more embodiments.

Referring now to FIG. 6, a flowchart 600 for leveraging a filmless outer lens with auto-shading for transparent and nontransparent applications is generally shown according to an embodiment. The flowchart 600 is described in reference to FIGS. 1 to 5 and may include additional steps not depicted in FIG. 6. Although depicted in a particular order, the blocks depicted in FIG. 6 can be rearranged, subdivided, and/or combined.

At block 602, the method includes coating a bottom lens with a first coating conductive layer.

At block 604, the method includes coating a top lens with a second coating conductive layer.

At block 606, the method includes fixing the top lens to the bottom lens.

At block 608, the method includes embedding an auto-shading material between the bottom lens and the top lens.

In some embodiments, the auto-shading material includes discrete substructures which vary in alignment in response to an electric field, thereby varying at least one of a transmittance and an emitted color through the outer lens.

At block 610, the method includes electrically coupling a wire to the auto-shading material.

At block 612, the method includes electrically coupling a controller to the wire. In some embodiments, the controller is configured to direct a switching voltage to a switch to change a state of the switch from a first state to a second state, thereby causing the wire to deliver the electric field to the discrete substructures to change at least one of the transmittance and the emitted color through the outer lens.

At block 614, the method includes receiving a call for the second state.

At block 616, the method includes, responsive to the call, directing the switching voltage to the switch, thereby causing the switch to change from the first state to the second state.

In some embodiments, the auto-shading material includes a filmless auto-shading material.

In some embodiments, the top lens and the bottom lens include transparent materials. In some embodiments, the top lens includes transparent materials and the bottom lens includes opaque materials.

In some embodiments, the auto-shading material includes a first transmittance when the switch is in the first state and a second transmittance greater than the first transmittance when the switch is in the second state.

In some embodiments, the outer lens emits a first color when the switch is in the first state and a second color different than the first color when the switch is in the second state.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle comprising:

an outer lens having a curvature of a radii of less than 300 mm, the outer lens comprising:

a bottom lens coated with a first coating conductive layer;

a top lens coated with a second coating conductive layer, the top lens fixed to the bottom lens;

a filmless auto-shading material embedded between the bottom lens and the top lens, the auto-shading material comprising discrete substructures which vary in alignment in response to an electric field, thereby varying at least one of a transmittance and an emitted color through the outer lens; and a wire electrically coupled to the auto-shading material; and a controller electrically coupled to the wire, the controller configured to direct a switching voltage to a switch to change a state of the switch, thereby causing the wire to deliver the electric field to the discrete substructures to change at least one of the transmittance and the emitted color through the outer lens.

2. The vehicle of claim 1, wherein the top lens is fixed to the bottom lens via one or more sealing caps.

3. The vehicle of claim 1, wherein the top lens and the bottom lens include transparent materials.

4. The vehicle of claim 1, wherein the top lens includes transparent materials and the bottom lens includes opaque materials.

5. The vehicle of claim 1, wherein the auto-shading material comprises a first transmittance when the switch is in a first state and a second transmittance greater than the first transmittance when the switch is in a second state.

6. The vehicle of claim 1, wherein the outer lens emits a first color when the switch is in a first state and a second color different than the first color when the switch is in a second state.

7. A lens having a curvature of a radii of less than 300 mm, the lens comprising:

a bottom lens coated with a first coating conductive layer;

a top lens coated with a second coating conductive layer, the top lens fixed to the bottom lens;

a filmless auto-shading material embedded between the bottom lens and the top lens, the auto-shading material comprising discrete substructures which vary in alignment in response to an electric field, thereby varying at least one of a transmittance and an emitted color through the lens; and a wire electrically coupled to the auto-shading material.

8. The lens of claim 7, wherein the top lens and the bottom lens include transparent materials.

9. The lens of claim 7, wherein the top lens includes a transparent material and the bottom lens includes an opaque material.

10. The lens of claim 7, wherein the wire is electrically coupled to a controller, the controller configured to direct a switching voltage to a switch to change a state of the switch, thereby causing the wire to deliver the electric field to the discrete substructures to change at least one of the transmittance and the emitted color through the lens.

11. The lens of claim 10, wherein the auto-shading material comprises a first transmittance when the switch is in a first state and a second transmittance greater than the first transmittance when the switch is in a second state.

12. The lens of claim 10, wherein the lens emits a first color when the switch is in a first state and a second color different than the first color when the switch is in a second state.

13. A method comprising:
providing an outer lens having a curvature of a radii of less than 300 mm, wherein providing the outer lens comprises:
coating a bottom lens with a first coating conductive layer;
coating a top lens with a second coating conductive layer;
fixing the top lens to the bottom lens;
embedding a filmless auto-shading material between the bottom lens and the top lens, the auto-shading material comprising discrete substructures which vary in alignment in response to an electric field, thereby varying at least one of a transmittance and an emitted color through the outer lens; and
electrically coupling a wire to the auto-shading material;
electrically coupling a controller to the wire, the controller configured to direct a switching voltage to a switch to change a state of the switch from a first state to a second state, thereby causing the wire to deliver the electric field to the discrete substructures to change at least one of the transmittance and the emitted color through the outer lens;
receiving a call for the second state; and
responsive to the call, directing the switching voltage to the switch, thereby causing the switch to change from the first state to the second state.

14. The method of claim 13, wherein the top lens and the bottom lens include transparent materials.

15. The method of claim 13, wherein the top lens includes transparent materials and the bottom lens includes opaque materials.

16. The method of claim 13, wherein the auto-shading material comprises a first transmittance when the switch is in the first state and a second transmittance greater than the first transmittance when the switch is in the second state.

17. The method of claim 13, wherein the outer lens emits a first color when the switch is in the first state and a second color different than the first color when the switch is in the second state.

18. The vehicle of claim 1, wherein the filmless auto-shading material further comprises tungsten oxide ($WO_3$).

19. The lens of claim 7, wherein the filmless auto-shading material further comprises tungsten oxide ($WO_3$).

20. The vehicle of method 13, wherein the filmless auto-shading material further comprises tungsten oxide ($WO_3$).

* * * * *